(12) United States Patent
Qiu

(10) Patent No.: US 10,560,267 B2
(45) Date of Patent: Feb. 11, 2020

(54) METHOD AND APPARATUS FOR VERIFYING BLOCK DATA IN A BLOCKCHAIN

(71) Applicant: Alibaba Group Holding Limited, George Town (KY)

(72) Inventor: Honglin Qiu, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/441,543

(22) Filed: Jun. 14, 2019

(65) Prior Publication Data

US 2019/0296916 A1 Sep. 26, 2019

Related U.S. Application Data

(63) Continuation of application No. PCT/CN2017/116835, filed on Dec. 18, 2017.

(30) Foreign Application Priority Data

Dec. 26, 2016 (CN) .......................... 2016 1 1215749

(51) Int. Cl.
*H04L 29/06* (2006.01)
*H04L 9/32* (2006.01)
(Continued)

(52) U.S. Cl.
CPC ........ *H04L 9/3236* (2013.01); *G06F 16/9027* (2019.01); *H04L 9/0637* (2013.01);
(Continued)

(58) Field of Classification Search
None
See application file for complete search history.

(56) References Cited

U.S. PATENT DOCUMENTS

| 4,849,978 A | 7/1989 | Dishon et al. |
| 6,161,183 A * | 12/2000 | Saito ....................... G06F 21/10 380/282 |

(Continued)

FOREIGN PATENT DOCUMENTS

| CN | 101290628 | 10/2008 |
| CN | 101452409 | 6/2009 |

(Continued)

OTHER PUBLICATIONS

PCT International Preliminary Report on Patentability in International Application No. PCT/CN2017/116835, dated Jul. 2, 2019. 10 pages (with English Translation).

(Continued)

*Primary Examiner* — Andrew J Steinle
(74) *Attorney, Agent, or Firm* — Fish & Richardson P.C.

(57) ABSTRACT

The present solution discloses example methods and systems for verifying block data. One example method includes identifying newly added data to be stored in a blockchain, and selecting a data node in a block to store the newly added data. A string is generated based on the newly added data, and then a verification value for the newly added data is developed from the string using a predetermined algorithm. A new verification value for the block is calculated based on the verification value of the newly added data and the original verification values of the unchanged data nodes in the block. The new verification value for the block can then be used to verify the data stored in the block is consistent with data stored in the rest of the blockchain.

20 Claims, 6 Drawing Sheets

(51) Int. Cl.
*H04L 9/06* (2006.01)
*G06F 16/901* (2019.01)
*H04L 9/16* (2006.01)

(52) U.S. Cl.
CPC .............. *H04L 9/0643* (2013.01); *H04L 9/16* (2013.01); *H04L 2209/38* (2013.01)

(56) References Cited

U.S. PATENT DOCUMENTS

| 2009/0183056 | A1 | 7/2009 | Aston | |
|---|---|---|---|---|
| 2016/0212146 | A1* | 7/2016 | Wilson | G06F 21/645 |
| 2016/0358135 | A1* | 12/2016 | Liao | G06Q 20/10 |
| 2016/0358253 | A1* | 12/2016 | Liao | G06Q 40/04 |
| 2017/0132621 | A1* | 5/2017 | Miller | G06Q 20/3829 |
| 2018/0046889 | A1* | 2/2018 | Kapinos | G06F 21/64 |

FOREIGN PATENT DOCUMENTS

| CN | 101478369 | 7/2009 |
|---|---|---|
| CN | 101482802 | 7/2009 |
| CN | 103312732 | 9/2013 |
| CN | 104142954 | 11/2014 |
| CN | 107015882 | 8/2017 |
| KR | 20040072816 | 8/2004 |
| TW | 583546 | 4/2004 |
| TW | 201403323 | 1/2014 |

OTHER PUBLICATIONS

PCT International Search Report and Written Opinion in International Application No. PCT/CN2017/116835, dated Mar. 19, 2018, 15 pages (with English Translation).

European Extended Search Report in European Patent Application No. 17885762.9, dated Oct. 11, 2019, 9 pages.

Goshal et al., "Exploiting Block-Chain Data Structure for Auditorless Auditing on Cloud Data," International Conference on Computer Analysis of Images and Patterns, 2016, pp. 359-371.

Mao et al., "A position-aware Merkle tree for dynamic cloud data integrity verification," Soft Computing, Springer-Verlag, Berlin, DE, 2015, 21(8):2151-2164.

Niaz et al., Semanticscholar.org [Online] "Merkle Hash Tree based Techniques for Data Integrity of Outsourced Data," Jan. 2015, [Dated Oct. 1, 2019], retrieved from: URL<https://pdfs.semanticscholar.org/5f8a/ e87238e505aa03ea6130cdf74454d7347de9.pdf>, 6 pages.

* cited by examiner

METHOD AND APPARATUS FOR VERIFYING BLOCK DATA IN A BLOCKCHAIN

CROSS-REFERENCE TO RELATED APPLICATIONS

This application is a continuation of PCT Application No. PCT/CN2017/116835, filed on Dec. 18, 2017, which claims priority to Chinese Patent Application No. 201611215749.3, filed on Dec. 26, 2016, and each application is hereby incorporated by reference in its entirety.

TECHNICAL FIELD

The present application relates to the field of computer communications technologies, and in particular, to a method and an apparatus for verifying block data in a blockchain.

BACKGROUND

A blockchain technology is also referred to as a distributed ledger technology, and is a distributed Internet database technology. The blockchain technology is decentralized, transparent, and trustable, and cannot be tampered with. Each piece of data stored in a blockchain is broadcast and stored in each block in the blockchain. Therefore, full and consistent data is stored in each block in the blockchain.

In practice, data stored in all blocks needs to keep consistent in a blockchain. A data verification method is usually used to verify whether data stored in all blocks is consistent.

Specifically, during block data verification, verification values of all blocks need to be determined, and the verification values of all the blocks need to be compared, to determine whether data stored in all the blocks in the blockchain is consistent.

Researches show that when a verification value of each block is to be determined, because an amount of data stored in the block is relatively large, when the verification value of the block is to be determined, all data stored in the block needs to be calculated, to calculate the verification value of the block. However, as an amount of data stored in the block increases, an amount of verification value calculation increases, and consequently data verification efficiency decreases.

Therefore, how to improve block data verification efficiency becomes a problem that needs to be alleviated in the art urgently.

The information disclosed in the background is merely intended to enhance an understanding of the general background of the present application, and should not be considered as acknowledging or conceding that the information constitutes the existing technology known to a person skilled in the art.

SUMMARY

In view of this, implementations of the present application provide a method and an apparatus for verifying block data, so as to alleviate a problem of relatively low block data verification efficiency in the existing technology.

An implementation of the present application provides a method for verifying block data, including: selecting, from a block including a plurality of data nodes, a data node configured to store newly added data; determining a verification value of the newly added data for the data node, and calculating an update verification value of the data node based on the verification value of the newly added data; and obtaining a verification value of the block based on the update verification value of the data node and original verification values of other data nodes included in the block; where the verification value of the block is used to verify whether data stored in the block is consistent with data stored in other blocks in a blockchain.

An implementation of the present application further provides an apparatus for verifying block data, including: a selection module, configured to select, from a block including a plurality of data nodes, a data node configured to store newly added data; a determining module, configured to determine a verification value of the newly added data for the data node, and calculate an update verification value of the data node based on the verification value of the newly added data; and a processing module, configured to obtain a verification value of the block based on the update verification value of the data node and original verification values of other data nodes included in the block; where the verification value of the block is used to verify whether data stored in the block is consistent with data stored in other blocks in a blockchain.

The previously described at least one technical solution used in the implementations of the present application can achieve the following beneficial effects:

When the new data is added to the block, the update verification value of the data node configured to store the newly added data is determined by using the newly added data, so as to alleviate a problem in the existing technology that much time is consumed because a verification value is calculated by using all data in a block when new data is added to the block. As such, when the verification value of the block that the new data is added to is calculated, consumed time is irrelevant to an amount of data in the block, and time for calculating the verification value is effectively shortened, improving block data verification efficiency.

BRIEF DESCRIPTION OF DRAWINGS

The accompanying drawings described here are intended to provide a further understanding of the present application, and constitute a part of the present application. The illustrative implementations of the present application and descriptions of the implementations of the present application are intended to describe the present application, and do not constitute limitations on the present application. In the accompanying drawings.

DESCRIPTION OF IMPLEMENTATIONS

Figure 1:
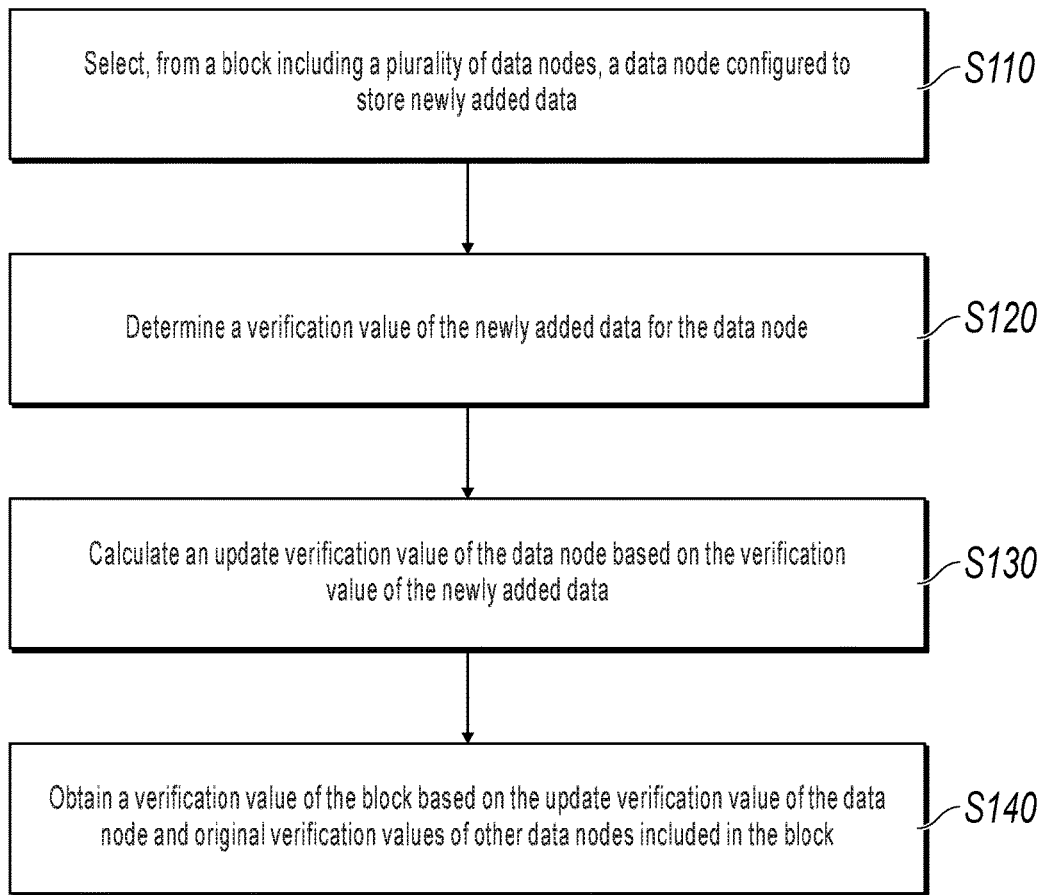
FIG. 1 is a schematic flowchart illustrating a method for verifying block data, according to an implementation of the present application.

To achieve objectives of the present application, the implementations of the present application provide a method and an apparatus for verifying block data. A data node configured to store newly added data is selected from a block including a plurality of data nodes; a verification value of the newly added data is determined for the data node, and an update verification value of the data node is calculated based on the verification value of the newly added data; and a verification value of the block is obtained based on the update verification value of the data node and original verification values of other data nodes included in the block. The verification value of the block is used to verify whether data stored in the block is consistent with data stored in other blocks in a blockchain. Compared with the existing technology for processing all historical data, in the implementations of the present application, the newly added data of the block is mainly considered, and for the block that the new data is added to, the verification value is calculated by using an incremental method, so as to alleviate a problem in the existing technology that much time is consumed because a verification value is calculated by using all data in a block when new data is added to the block. As such, when the verification value of the block that the new data is added to is calculated, consumed time is irrelevant to an amount of data in the block, and time for calculating the verification value is effectively shortened, improving block data verification efficiency.

It is worthwhile to note that a predetermined algorithm used to calculate a verification value that is described in the implementations of the present application can be various verification algorithms, or can be various irreversible algorithms, and a specific algorithm type is not specifically limited in the implementations of the present application.

For example, a needed verification value can be calculated by using a hash algorithm. The hash algorithm can also be referred to as a hash function. The hash function is a unidirectional cryptographic system, in other words, the hash function is an irreversible mapping from plaintext to ciphertext, in other words, the function includes only an encryption process and does not include a decryption process. In addition, the hash function can obtain an output of a fixed length after changing an input of any length. A typical hash algorithm includes MD2, MD4, MD5, SHA-1, etc.

A person skilled in the art should understand that the hash algorithm mentioned in the specification of the implementations of the present application is merely an example, and does not constitute a limitation on the present disclosure. A person skilled in the art can use other algorithms used for verification based on actual applications and needs. This is not specifically limited here.

To make the objectives, technical solutions, and advantages of the present application clearer, the following clearly and comprehensively describes the technical solutions of the present application with reference to specific implementations of the present application and corresponding accompanying drawings. Apparently, the described implementations are only some rather than all of the implementations of the present application. All other implementations obtained by a person of ordinary skill in the art based on the implementations of the present application without creative efforts shall fall within the protection scope of the present application.

The following describes in detail the technical solutions provided in the implementations of the present application with reference to the accompanying drawings.

FIG. 1 is a schematic flowchart illustrating a method for verifying block data, according to an implementation of the present application. The method for verifying block data includes the following steps.

Step S110: Select, from a block including a plurality of data nodes, a data node configured to store newly added data.

A blockchain is obtained by connecting several blocks by using a chain data structure. Each block includes a plurality of data nodes. The data nodes included in the block can be constructed in a form of a Merkle tree, in other words, each include a root node and a plurality of leaf nodes.

Figure 2:
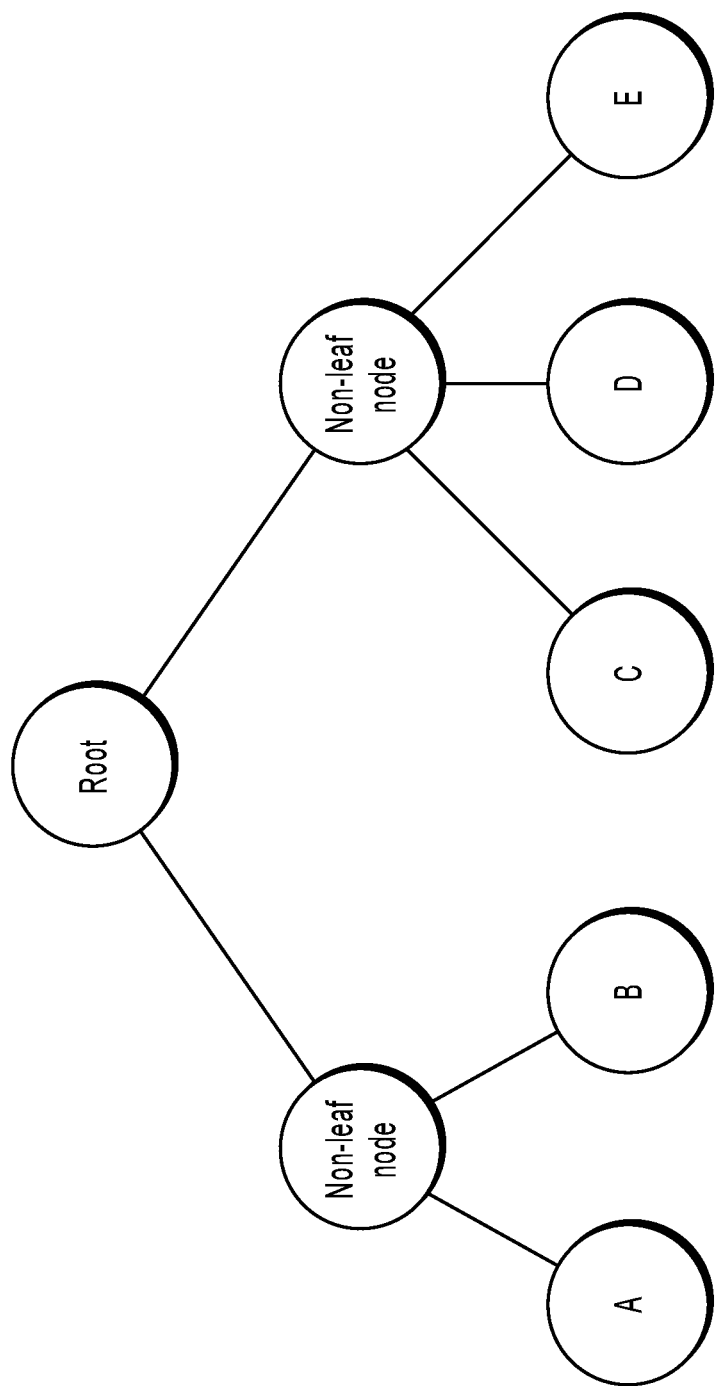
FIG. 2 is a schematic structural diagram illustrating a Merkle tree, according to an implementation of the present application.

In the Merkle tree structure, the data nodes included in the block are used as bottom leaf nodes in the Merkle tree structure, which are shown in FIG. 2.

It can be seen from FIG. 2 that in the Merkle tree structure, A, B, C, D, and E correspond to the data nodes in the block.

A person skilled in the art should understand that the Merkle tree is constructed based on the data nodes in the block, and the depth of the Merkle tree can be determined as needed.

It is worthwhile to note that to ensure consistency between data stored in all blocks in the blockchain, Merkle trees constructed in all the blocks in the blockchain have a same depth, and quantities of data nodes included in all the blocks are also the same. In addition, it should be further understood that the Merkle tree listed here is merely an example for description, and a person skilled in the art can use other appropriate data construction forms. This is not specifically limited here.

For data to be stored (the data here can be referred to as newly added data), a block used to store the newly added data is first determined, and then a data node in the block that is configured to store the newly added data is determined.

Therefore, when the newly added data is received, block information used to store the newly added data is first determined. The block information includes a block identifier and a data node identifier.

Specifically, data content corresponding to the newly added data is calculated, to obtain the determined block information.

In this implementation of the present application, the data content corresponding to the newly added data can be determined based on a type of the newly added data, or can be determined based on data included in the newly added data. This is not specifically limited here.

For example, if the newly added data is text data, the data content corresponding to the newly added data can be understood as a content digest of the text data, or can be understood as the text data, and the data content (for example, the content digest or the text data) corresponding to the newly added data can be calculated based on a predetermined algorithm, to obtain a calculation result. In this case, the block information is determined based on the calculation result.

For another example, if the newly added data is one piece of transaction data, the transaction data can be calculated based on a predetermined algorithm, to obtain a calculation result. In this case, the block information is determined based on the calculation result.

In the predetermined algorithm described in this implementation of the present application, for example, in a remainder calculation method, the data content is converted into integer data, a quantity of blocks included in the blockchain is used as a divisor, and the integer data is calculated by using the divisor, to obtain a quotient and a remainder. The quotient here can be considered as a block identifier, and the remainder can be considered as a data node identifier in the block. Alternatively, the quotient can be considered as the data node identifier, and the remainder can be considered as the block identifier.

Certainly, to assign the newly added data to an appropriate block and data node as needed, a person skilled in the art can also use other methods for calculating the data content, for example, performing random calculation on the data content. This is not limited here.

Then, the blockchain is searched based on the block identifier for a block corresponding to the block identifier, and a data node corresponding to the data node identifier is determined from the found block.

In a process of obtaining the blockchain, one block identifier is determined for each block. Therefore, when the block information is obtained, the blockchain can be searched based on the block identifier in the block information for the block corresponding to the block identifier.

Each block includes a plurality of data nodes, and one data node identifier can be determined for each data node. Therefore, when the block information is obtained, the data node corresponding to the data node identifier can be determined from the found blockchain based on the data node identifier in the block information.

Finally, the found data node is used as the data node configured to store the newly added data.

Step S120: Determine a verification value of the newly added data for the data node.

In this implementation of the present application, because data possibly has been stored in the data node before the newly added data is stored in the data node, and some of these data is possibly associated with the newly added data, the data associated with the newly added data can be referred to as associated data. Alternatively, the data stored in the data node is possibly not associated with the newly added data, in other words, the data node does not include associated data associated with the newly added data.

It is worthwhile to note that the association relationship described in this implementation of the present application can be a relationship generated because of a user account, a payment activity, a transaction time, a transaction location, etc., for example, two pieces of transaction data of one user. In this case, the two pieces of transaction data are associated because of a same user account. Alternatively, the association relationship can be a relationship generated because of a transaction behavior. For example, content recorded in one piece of transaction data is that a user A transfers 100 yuan to a user B, and content recorded in the other piece of transaction data is that the user B transfers 100 yuan to the user A. In this case, the two pieces of transaction data are associated because objects and money included in the transfer behavior are the same. Specific content of the association relationship is not specifically limited here.

In addition, no data possibly has been stored in the data node before the newly added data is stored in the data node. In this case, it can be considered that the data node does not include associated data associated with the newly added data.

Therefore, determining the verification value of the newly added data can include but is not limited to the following two cases:

Case 1: The data node does not include associated data associated with the newly added data.

Figure 3:
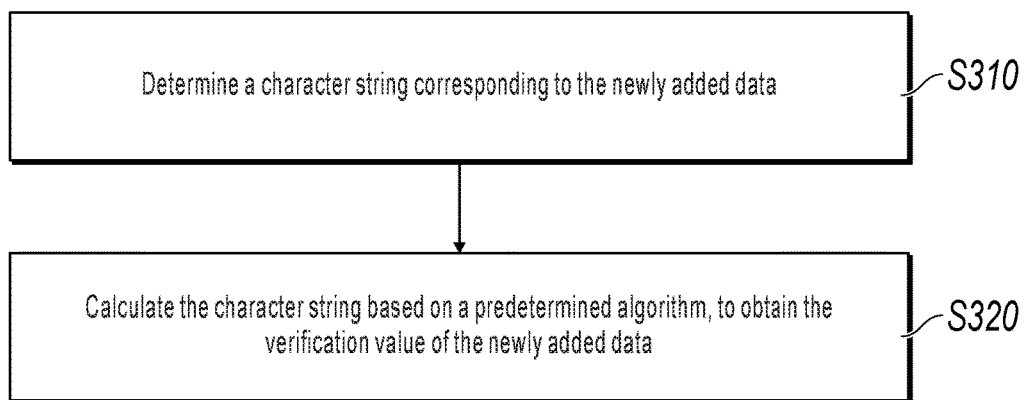
FIG. 3 is a schematic flowchart of determining a verification value of newly added data, according to an implementation of the present application.

For determining the verification value of the newly added data, reference can be made to FIG. 3. FIG. 3 is a schematic flowchart of determining a verification value of newly added data, according to an implementation of the present application.

S310. Determine a character string corresponding to the newly added data.

In this implementation of the present application, the character string corresponding to the newly added data can be determined by using any appropriate technical methods of converting data into a character string, for example, by converting the newly added data into the character string by using a corresponding transfer function. This is not specifically limited here.

S320. Calculate the character string based on a predetermined algorithm, to obtain the verification value of the newly added data.

Specifically, the character string is calculated by using a hash algorithm, to obtain a hash value of the newly added data, and use the hash value as the verification value of the newly added data.

A person skilled in the art should understand that the hash algorithm mentioned here is merely an example, and does not constitute a limitation on the present disclosure.

Case 2: The data node includes associated data associated with the newly added data.

Figure 4:
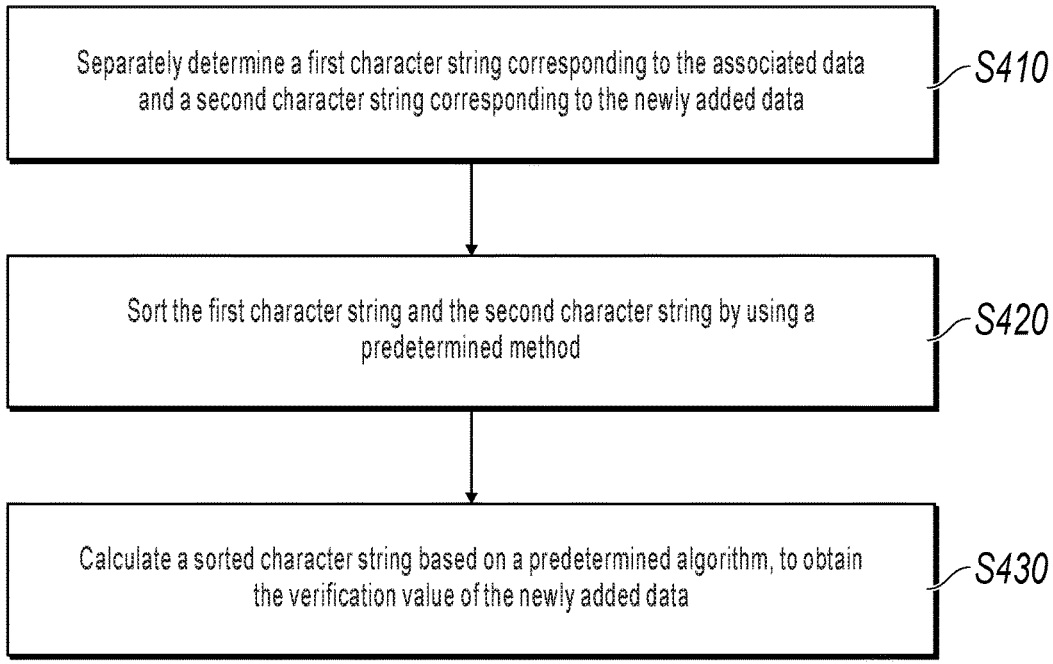
FIG. 4 is a schematic flowchart of determining a verification value of newly added data, according to an implementation of the present application.

For determining the verification value of the newly added data, reference can be made to FIG. 4. FIG. 4 is a schematic flowchart of determining a verification value of newly added data, according to an implementation of the present application.

S410. Separately determine a first character string corresponding to the associated data and a second character string corresponding to the newly added data.

Likewise, the first character string corresponding to the associated data and the second character string corresponding to the newly added data can be determined by using any appropriate technical methods of converting data into a character string, for example, by converting the newly added data into the character string by using a corresponding transfer function. This is not specifically limited here.

S420. Sort the first character string and the second character string by using a predetermined method.

It is worthwhile to note that the predetermined method can be determined based on an actual need, or can be determined based on an experimental result. A sorting method used in this implementation of the present application is not limited. For example, the first character string and the second character string are sequentially sorted, to combine the first character string and the second character string to obtain a character string group used for calculation. Whether the first character string is before the second character string or the second character string is before the first character string is not limited in this implementation of the present application. A person skilled in the art can also use other sorting methods.

S430. Calculate a sorted character string based on a predetermined algorithm, to obtain the verification value of the newly added data.

Specifically, the sorted character string is calculated by using a hash algorithm, to obtain a hash value of the newly added data, and use the hash value as the verification value of the newly added data.

Step S130: Calculate an update verification value of the data node based on the verification value of the newly added data.

Specifically, an original verification value of the data node obtained before the newly added data is stored; and the update verification value of the data node is calculated based on the original verification value and the verification value of the newly added data.

In this implementation of the present application, if other data has been stored before the newly added data is stored in the data node, a verification value is calculated for the data node when the other data is stored. The verification value can be referred to as an original verification value for the newly added data.

For example, for a data node A, one verification value is calculated each time one piece of data is stored, in other words, the verification value of the data node changes with data in the data node. Assume that data 11 and data 12 have been stored in the data node A before the newly added data is stored, a verification value a is calculated when the data 11 is stored in the data node, and a can be referred to as an original verification value when the data 12 is stored in the data node. In this case, a verification value b is calculated by using the original verification value, and b can be referred to as an update verification value.

Assume that the newly added data is data 13, a verification value c of the data 13 is obtained according to step S120. In this case, a verification value, namely, the verification value b, of the data node obtained before the data 13 is stored needs to be determined, and the verification value b is referred to as an original verification value. The update verification value of the data node is calculated based on a predetermined algorithm by using the verification value c and the verification value b.

It is worthwhile to note that if no data has been stored in the data node, and the newly added data is used as first data of the data node, the verification value of the newly added data can be considered as the verification value of the data node in this implementation of the present application.

Step S140: Obtain a verification value of the block based on the update verification value of the data node and original verification values of other data nodes included in the block.

In this implementation of the present application, a tree structure corresponding to the plurality of data nodes included in the block is determined, and the original verification value of the other data nodes included in the block is determined; and the tree structure is traversed based on the update verification value of the data node and the original verification values of the other data nodes included in the block, to obtain a verification value of a root node of the tree structure, and use the verification value of the root node as the verification value of the block.

Content shown in FIG. 2 is used as an example. Assume that no newly added data has been stored in the block shown in FIG. 2, a verification value corresponding to the data node A shown in FIG. 2 is a, a verification value corresponding to the data node B is b, a verification value corresponding to the data node C is c, a verification value corresponding to the data node D is d, and a verification value corresponding to the data node E is e.

In this case, the newly added data needs to be stored in the data node A, and therefore the verification value a, the verification value b, the verification value c, the verification value d, and the verification value e are referred to as original verification values.

After the newly added data is stored in the data node A, the verification value of the data node A changes. Assume that the verification value of the data node A changes from the verification value a to a verification value g, the verification value g can be referred to as an update verification value of the data node A.

In this case, a verification value of the block is calculated based on a predetermined algorithm by using the verification value g of the data node A, the verification value b of the data node B, the verification value c of the data node C, the verification value d of the data node D, and the verification value e of the data node E.

For example, the verification value of the block is calculated based on the tree structure that is corresponding to the data node A, the data node B, the data node C, the data node D, and the data node E and that is shown in FIG. 2 and by using the verification value g of the data node A, the verification value b of the data node B, the verification value c of the data node C, the verification value d of the data node D, and the verification value e of the data node E.

After the verification value of the block is obtained, the verification value can be compared with verification values of other blocks in a blockchain. If the two verification values are consistent, it indicates that data stored in the block is consistent with data stored in the other blocks, and the verification succeeds. If the two verification values are inconsistent, it indicates that data stored in the block is inconsistent with data stored in the other blocks. For example, the data in the block possibly has been lost or tampered with, and the verification cannot succeed.

In this implementation of the present application, the verification value of the block that changes with the newly added data is quickly determined by using an incremental calculation method, so as to shorten time for calculating the verification value, and improves system computing performance.

According to the technical solutions provided in the implementations of the present application, a data node configured to store newly added data is selected from a block including a plurality of data nodes; a verification value of the newly added data is determined for the data node, and an update verification value of the data node is calculated based on the verification value of the newly added data; and a verification value of the block is obtained based on the update verification value of the data node and original verification values of other data nodes included in the block. The verification value of the block is used to verify whether data stored in the block is consistent with data stored in other blocks in a blockchain. Compared with the existing technology for processing all historical data, in the implementations of the present application, the newly added data of the block is mainly considered, and for the block that the new data is added to, the verification value is calculated by using an incremental method, so as to alleviate a problem in the existing technology that much time is consumed because a verification value is calculated by using all data in a block when new data is added to the block. As such, when the verification value of the block that the new data is added to is calculated, consumed time is irrelevant to an amount of data in the block, and time for calculating the verification value is effectively shortened, improving block data verification efficiency.

In addition, if original data that is not processed is tampered with, although the tampering is not found when the verification value of the newly added data is calculated in the implementations of the present application, the data-tampering can be surely found when data update is performed in each block of the blockchain because of structure and properties of the blockchain. Therefore, final block data verification is not affected.

Figure 5:
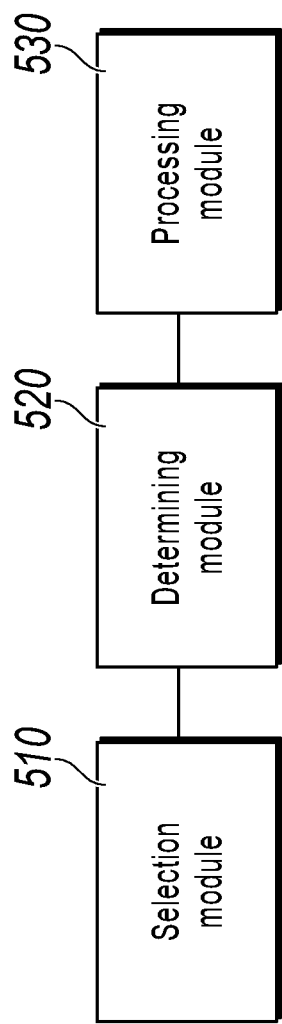
FIG. 5 is a schematic structural diagram illustrating an apparatus for verifying block data, according to an implementation of the present application.

FIG. 5 is a schematic structural diagram illustrating an apparatus for verifying block data, according to an implementation of the present application. The apparatus for verifying block data includes a selection module 510, a determining module 520, and a processing module 530.

The selection module 510 is configured to select, from a block including a plurality of data nodes, a data node configured to store newly added data.

The determining module 520 is configured to determine a verification value of the newly added data for the data node, and calculate an update verification value of the data node based on the verification value of the newly added data.

The processing module 530 is configured to obtain a verification value of the block based on the update verification value of the data node and original verification values of other data nodes included in the block.

The verification value of the block is used to verify whether data stored in the block is consistent with data stored in other blocks in a blockchain.

In another implementation of the present application, that the selection module 510 selects, from a block including a plurality of data nodes, a data node configured to store newly added data includes the following: when the newly added data is received, determining block information used to store the newly added data, where the block information includes a block identifier and a data node identifier; searching, based on the block identifier, the blockchain for a block corresponding to the block identifier, and determining, from the found block, a data node corresponding to the data node identifier; and using the found data node as the data node configured to store the newly added data.

In another implementation of the present application, that the selection module 510 determines block information used to store the newly added data includes the following: calculating data content corresponding to the newly added data, to obtain the determined block information.

In another implementation of the present application, that the determining module 520 determines a verification value of the newly added data includes the following: when it is determined that the data node does not include associated data of the newly added data, determining a character string corresponding to the newly added data; and calculating the character string based on a predetermined algorithm, to obtain the verification value of the newly added data.

In another implementation of the present application, that the determining module 520 determines a verification value of the newly added data includes the following: when it is determined that the data node includes associated data of the newly added data, separately determining a first character string corresponding to the associated data and a second character string corresponding to the newly added data; sorting the first character string and the second character string by using a predetermined method; and calculating a sorted character string based on a predetermined algorithm, to obtain the verification value of the newly added data.

In another implementation of the present application, that the determining module 520 calculates an update verification value of the data node based on the verification value of the newly added data includes the following: determining an original verification value of the data node obtained before the newly added data is stored; and calculating the update verification value of the data node based on the original verification value and the verification value of the newly added data.

In another implementation of the present application, that the processing module 530 obtains a verification value of the block based on the update verification value of the data node and original verification values of other data nodes included in the block includes the following: determining a tree structure corresponding to the plurality of data nodes included in the block, and determining the original verification values of the other data nodes included in the block; and traversing the tree structure based on the update verification value of the data node and the original verification values of the other data nodes included in the block, to obtain a verification value of a root node of the tree structure, and use the verification value of the root node as the verification value of the block.

It is worthwhile to note that the apparatus for verifying block data described in this implementation of the present application can be implemented by using software, or can be implemented by using hardware. This is not specifically limited here. According to the apparatus for verifying block data, for the block that the new data is added to, the verification value is calculated by using an incremental method, so as to alleviate a problem in the existing technology that much time is consumed because a verification value is calculated by using all data in a block when new data is added to the block. As such, when the verification value of the block that the new data is added to is calculated, consumed time is irrelevant to an amount of data in the block, and time for calculating the verification value is effectively shortened, improving block data verification efficiency.

In the 1990s, improvement of a technology can be clearly distinguished between hardware improvement (for example, improvement on a circuit structure such as a diode, a transistor, or a switch) and software improvement (improvement on a method procedure). However, with the development of technologies, improvement of many method procedures can be considered as direct improvement of a hardware circuit structure. Designers almost all program an improved method procedure to a hardware circuit, to obtain a corresponding hardware circuit structure. Therefore, it cannot be said that improvement of a method procedure cannot be implemented by using a hardware entity module. For example, a programmable logic device (PLD) (for example, a field programmable gate array (FPGA)) is such an integrated circuit. A logical function of the programmable logic device is determined by component programming executed by a user. The designers perform voluntary programming to "integrate" a digital system into a single PLD without requiring a chip manufacturer to design and produce a dedicated integrated circuit chip. In addition, instead of manually producing an integrated circuit chip, the programming is mostly implemented by "logic compiler" software, which is similar to a software compiler used during program development. Original code before compiling is also written in a specific programming language, which is referred to as a hardware description language (HDL), and there is more than one type of HDL, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, and RHDL (Ruby Hardware Description Language), etc. Currently, VHDL (Very-High-Speed Integrated Circuit Hardware Description Language) and Verilog are most commonly used. A person skilled in the art should also understand that a method procedure only needs to be logically programmed, and programmed to the integrated circuit by using the previous hardware description languages so that a hardware circuit that implements the logical method procedure can be easily obtained.

A controller can be implemented by using any appropriate method. For example, the controller can be a microprocessor or a processor, or a computer-readable medium, a logic gate, a switch, an application-specific integrated circuit (ASIC), a programmable logic controller, or an embedded microprocessor that stores computer readable program code (such as software or firmware) that can be executed by the microprocessor or the processor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that a controller can be implemented by using pure computer-readable program code, and the steps in the method can be logically programmed to enable the controller to further implement same functions in forms of a logic gate, a switch, an application-specific integrated circuit, a programmable logic controller, an embedded microcontroller, etc. Therefore, the controller can be considered as a hardware component, and an apparatus that is included in the controller and that is configured to implement various functions can also be considered as a structure in the hardware component. Alternatively, an apparatus configured to implement various functions can be considered as both a software module for implementing the method and a structure in the hardware component.

The system, apparatus, module, or unit described in the described implementations can be implemented by a computer chip or an entity, or implemented by a product with a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

For ease of description, the described apparatus is described by dividing functions into various units. Certainly, when the present application is implemented, the functions of the units can be implemented in one or more pieces of software and/or hardware.

A person skilled in the art should understand that the implementations of the present disclosure can be provided as a method, a system, or a computer program product. Therefore, the present disclosure can use a form of hardware only implementations, software only implementations, or implementations with a combination of software and hardware. In addition, the present disclosure can use a form of a computer program product that is implemented on one or more computer-usable storage media (including but not limited to a disk memory, a CD-ROM, and an optical memory) that include computer-usable program code.

The present disclosure is described with reference to the flowcharts and/or block diagrams of the method, the device (system), and the computer program product according to the implementations of the present disclosure. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of any other programmable data processing device to generate a machine so that the instructions executed by a computer or a processor of any other programmable data processing device generate an apparatus for implementing a specific function in one or more processes in the flowcharts or in one or more blocks in the block diagrams.

These computer program instructions can be stored in a computer readable memory that can instruct the computer or any other programmable data processing device to work in a specific method, so that the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded to a computer or other programmable data processing devices, so that a series of operations and steps are performed on the computer or the other programmable devices, generating computer-implemented processing. Therefore, the instructions executed on the computer or the other programmable devices provide steps for implementing a specific function in one or more processes in the flowcharts or in one or more blocks in the block diagrams.

In a typical configuration, the computing device includes one or more processors (CPU), one or more input/output interfaces, one or more network interfaces, and one or more memories.

The memory can include a non-persistent memory, a random access memory (RAM) and/or a nonvolatile memory in a computer readable medium, for example, a read-only memory (ROM) or a flash memory (flash RAM).

The computer readable medium includes persistent, non-persistent, movable, and unmovable media that can implement information storage by using any method or technology. Information can be a computer readable instruction, a data structure, a program module, or other data. A computer storage medium includes but is not limited to a phase-change random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD) or another optical storage, a magnetic tape, a magnetic disk storage, another magnetic storage device, or any other non-transmission media that can be used to store information that can be accessed by the computing device. Based on the definition in the present specification, the computer readable medium does not include transitory computer readable medium (transitory media), for example, a modulated data signal and carrier.

It is worthwhile to further note that the term "include", "contain", or their any other variant is intended to cover a non-exclusive inclusion, so that a process, a method, merchandise, or a device that includes a list of elements not only includes those elements but also includes other elements which are not expressly listed, or further includes elements inherent to such process, method, merchandise, or device. An element preceded by "includes a . . . " does not, without more constraints, preclude the existence of additional identical elements in the process, method, merchandise, or device that includes the element.

A person skilled in the art should understand that the implementations of the present application can be provided as a method, a system, or a computer program product. Therefore, the present application can use a form of hardware only implementations, software only implementations, or implementations with a combination of software and hardware. In addition, the present application can use a form of a computer program product that is implemented on one or more computer-usable storage media (including but not limited to a disk memory, a CD-ROM, and an optical memory) that include computer-usable program code.

The previous descriptions are merely implementations of the present application, and are not intended to limit the present application. A person skilled in the art can make various modifications and changes to the present application. Any modification, equivalent replacement, improvement, etc. made within the spirit and principle of the present application shall fall within the scope of the claims of the present application.

As described herein, the present solution and description relates to implementations for verifying block data in a blockchain. By calculating an updated verification value from new data to be added to a data node in a block, as opposed to the currently stored data in a block, and using the original verification values from other data nodes, the calculation time of the verification is shortened, and the processing power required to perform the verification is lessened.

The proposed solution provides various technical advantages. In existing technology, a number of verification calculations increase as the amount of data in a block increases. In the present solution, the verification value is determined using the newly added data (that is, not the full data of the block), such that the time required for calculation is independent on the total amount of data in the block and is instead based on the new data being added to the block. The result is shorter calculation times, which allows a computer or computers to process larger blocks more efficiently. The present solution improves the processing of the blockchain, allowing for faster block updates and more efficient computation of verification values used to ensure the data in a block has not been lost or tampered with.

Figure 6:
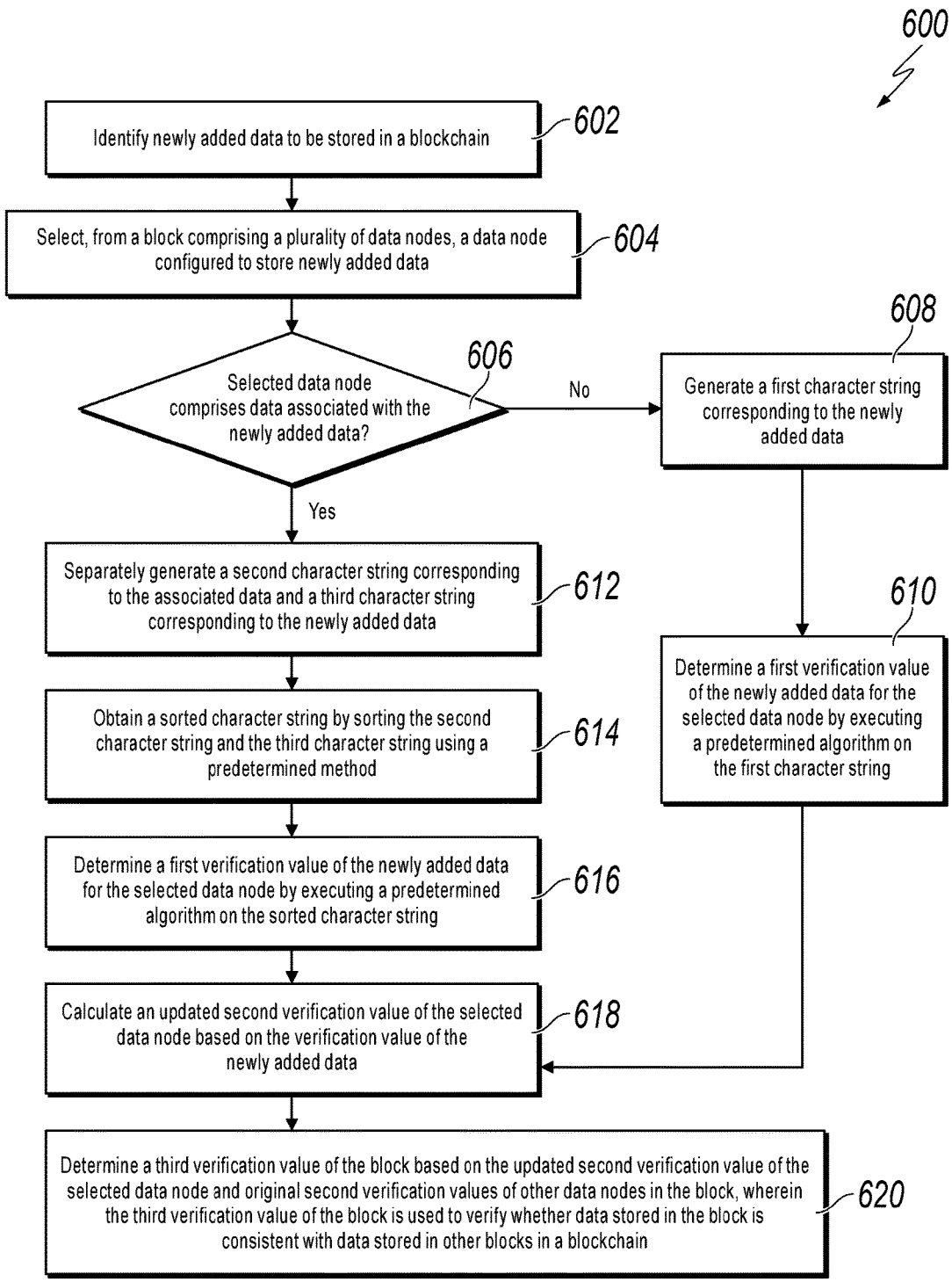
FIG. 6 is a flowchart illustrating an example of a computer-implemented method for verifying block data, according to an implementation of the present disclosure.

FIG. 6 is a flowchart illustrating an example of a computer-implemented method 600 for verifying block data, according to an implementation of the present disclosure. For clarity of presentation, the description that follows generally describes method 600 in the context of the other figures in this description. However, it will be understood that method 600 can be performed, for example, by any system, environment, software, and hardware, or a combination of systems, environments, software, and hardware, as appropriate. In some implementations, various steps of method 600 can be run in parallel, in combination, in loops, or in any order.

At 602, newly added data is identified to be stored in a blockchain. The newly added data may be text data, transaction data, quantity data, or any suitable alternative. From 602, method 600 proceeds to 604.

At 604, a data node configured to store newly added data is selected from a block comprising a plurality of data nodes. The block may be a block in a blockchain, which connects several blocks using a chain data structure. Each block may be configured in the form of a Merkle tree, including a root node, non-leaf nodes, and leaf nodes. A data node may be a leaf node in this configuration. The Merkle tree may have a depth as determined to be needed. For consistency, all of the Merkle trees in a given blockchain may have the same depth and quantity of data nodes.

In some instances, the data node may be selected using a block identifier and a data node identifier that are determined when receiving newly added data. The block identifier and data node identifier may be determined based on the type of newly added data or on calculated data content of the newly added data. For example, the block identifier and data node identifier may be determined based on a calculation result obtained after executing an algorithm on the newly added data.

In one instance, the algorithm may be a remainder calculation method, wherein the newly added data is converted into integer data. In the remainder calculation method, a quantity of blocks included in a blockchain is used as a divisor, and the integer data is calculated by using the divisor to obtain a quotient and a remainder. The quotient in this instance may be the block identifier, and the remainder may be the data node identifier. Alternatively, the quotient may be the data node identifier, and the remainder may be the block identifier.

A data node configured to store the newly added data may be selected by searching the blockchain for the block corresponding to the block identifier, where the block is a found block. Then, from the found block, a found data node corresponding to the data node identifier is determined, and the found data node is selected as the data node configured to store the newly added data. From 604, method 600 proceeds to 606.

At 606, a determination is made as to whether the selected data node comprises data associated with the newly added data. The data node may have previously had data stored in it, such that the previously stored data may be associated with the newly added data. For example, the previously stored data may be a transaction from the same user account as the newly added data. In another example, the previously stored data may be associated with the newly added data because it relates to transactions of the same amount, or between the same users, among other things. If it is determined that the data node does not comprise or include data associated with the newly added data, then method 600 proceeds to method 608. Otherwise, method 600 proceeds to 612 in response to determining that the data node comprises data associated with the newly added data.

At 608, a first character string corresponding to the newly added data is generated. This can be accomplished or performed using any suitable method of converting data into a character string. For example, a corresponding transfer function may be used. From 608, method 600 proceeds to 610.

At 610, a first verification value of the newly added data for the data node is determined or calculated by executing a predetermined algorithm on the first character string. The predetermined algorithm can be one or a combination of various suitable algorithms, including irreversible algorithms. For example, a verification value can be calculated using a hash algorithm (also known as a hash function). A hash function may be a unidirectional cryptographic system, resulting in an irreversible mapping from plaintext to ciphertext. A hash function can produce an output of fixed length for an input of arbitrary length. Hash functions may include MD2, MD4, MD5, SHA-1, among others. From 610, method 600 proceeds to 618.

Returning to 606, method 600 proceeds to 612 when it is determined that the selected data node comprises data associated with the newly added data. At 612, a second character string corresponding to the newly added data is generated, while a third character string corresponding to the associated data is separately generated. The second and third character strings are determined using any suitable method of converting data into a character string, including the same or different functions from each other or as described in generating the first character string. From 612, method 600 proceeds to 614.

At 614, a sorted character string is obtained by sorting the second character string and the third character string using a predetermined method to obtain a character string group. The predetermined method may be any suitable method for sorting character strings into character string groups. For example, the predetermined method may be a sequential sorting, such as placing the second character string in front of the third character string or vice versa. From 614, method 600 proceeds to 616.

At 616, a first verification value of the newly added data for the selected data node is determined by executing a predetermined algorithm on the sorted character string. The predetermined algorithm and its application may be similar or different to the algorithms described with regard to operations performed at 610. From 616, method 600 proceeds to 618.

At 618, an updated second verification value of the selected data node is calculated based on the value of the newly added data. The updated second verification value may be calculated by determining an original second verification value for the selected data node prior to storing the newly added data, and calculating the updated second verification value of the selected data node based on the original second verification value and the first verification value of the newly added data (for example, determined at either 616 or 610). From 618, method 600 proceeds to 620.

At 620, a third verification value of the block is determined based on the updated second verification value of the selected data node and original second verification values of the other data nodes in the block. The third verification value of the block is used to verify whether data stored in the block is consistent with the data stored in other blocks in a blockchain. In one instance, the block may contain a tree structure with a root node, non-leaf nodes, and leaf nodes corresponding to a plurality of data nodes. In this instance, the updated second verification value of the selected data node and the original second verification values of the other data nodes in the block are calculated to obtain a third verification value of the root node, which is used as the third verification value of the block.

The third verification value of the block may then be compared with the verification values of other blocks in a blockchain. If the verification values are consistent, the consistency indicates that the stored data in the block is consistent with the data stored in the other blocks, and the verification is determined to succeed. If the third verification values between blocks are inconsistent, the inconsistency indicates that data stored in the block has possibly been lost or tampered with, and verification cannot succeed. After 620 method 600 stops.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for verifying block data, the computer-implemented method comprising:
   identifying newly added data to be stored in a blockchain;
   selecting, from a block comprising a plurality of data nodes, a data node configured to store the newly added data;
   determining whether the selected data node comprises data associated with the newly added data; and
   in response to determining that the selected data node does not comprise data associated with the newly added data:
      generating a first character string corresponding to the newly added data;
      determining a first verification value of the newly added data for the selected data node by executing a predetermined algorithm on the first character string;
      calculating a second updated verification value of the selected data node based on the first verification value of the newly added data; and
      determining a third verification value of the block based on the second updated verification value of the selected data node and original second verification values of other data nodes of the block, wherein the third verification value of the block is used to verify whether data stored in the block is consistent with data stored in other blocks in a blockchain.

2. The computer-implemented method of claim 1, wherein selecting the data node comprises:
   in response to receiving the newly added data, determining a block identifier and a data node identifier, wherein the block identifier and the data node identifier are used to store the newly added data;
   searching, based on the block identifier, the blockchain for a block corresponding to the block identifier, wherein results of the search comprise a found block;
   determining, from the found block and the data node identifier, a found data node corresponding to the data node identifier; and
   selecting the found data node as the data node configured to store the newly added data.

3. The computer-implemented method of claim 2, wherein determining the block identifier and data node identifier comprises:
   calculating data content corresponding to the newly added data to obtain the block identifier and data node identifier.

4. The computer-implemented method of claim 1, wherein the predetermined algorithm comprises an encryption algorithm and the first verification value comprises an encrypted value of the newly added data.

5. The computer-implemented method of claim 4, wherein the encryption algorithm comprises a hash algorithm and the encrypted value comprises a hash value of the newly added data.

6. The computer-implemented method of claim 1, wherein, in response to determining that the selected data node comprises data associated with the newly added data, the method further comprises:

separately generating a second character string corresponding to the newly added data and a third character string corresponding to the data associated with the newly added data;
obtaining a sorted character string by sorting the second character string and the third character string using a predetermined method; and
determining a first verification value of the newly added data for the data node by executing a predetermined algorithm on the sorted character string.

7. The computer-implemented method of claim 6, wherein the sorted character string comprises a character string group included in the first verification value of the newly added data.

8. The computer-implemented method of claim 1, wherein calculating the updated second verification value of the selected data node comprises:
determining an original second verification value of the selected data node obtained before the newly added data is stored; and
calculating the updated second verification value of the selected data node based on the original second verification value and the first verification value of the newly added data.

9. The computer-implemented method of claim 1, wherein determining the third verification value comprises:
determining a tree structure corresponding to the plurality of data nodes comprised in the block;
determining the original second verification values of the other data nodes comprised in the block;
traversing the tree structure based on the updated second verification value of the selected data node and the original second verification values of the other data nodes comprised in the block, to obtain a third verification value of a root node of the tree structure; and
using the third verification value of the root node as the third verification value of the block.

10. A non-transitory, computer-readable medium storing one or more instructions executable by a computer system to perform operations comprising:
identifying newly added data to be stored in a blockchain;
selecting, from a block comprising a plurality of data nodes, a data node configured to store the newly added data;
determining whether the selected data node comprises data associated with the newly added data; and
in response to determining that the selected data node does not comprise data associated with the newly added data:
generating a first character string corresponding to the newly added data;
determining a first verification value of the newly added data for the selected data node by executing a predetermined algorithm on the first character string;
calculating a second updated verification value of the selected data node based on the first verification value of the newly added data; and
determining a third verification value of the block based on the second updated verification value of the selected data node and original second verification values of other data nodes of the block, wherein the third verification value of the block is used to verify whether data stored in the block is consistent with data stored in other blocks in a blockchain.

11. The computer-readable medium of claim 10, wherein selecting the data node comprises:

in response to receiving the newly added data, determining a block identifier and a data node identifier, wherein the block identifier and the data node identifier are used to store the newly added data;
searching, based on the block identifier, the blockchain for a block corresponding to the block identifier, wherein results of the search comprise a found block;
determining, from the found block and the data node identifier, a found data node corresponding to the data node identifier; and
selecting the found data node as the data node configured to store the newly added data.

12. The computer-readable medium of claim 11, wherein determining the block identifier and data node identifier comprises:
calculating data content corresponding to the newly added data to obtain the block identifier and data node identifier.

13. The computer-readable medium of claim 10, wherein the predetermined algorithm comprises an encryption algorithm and the first verification value comprises an encrypted value of the newly added data.

14. The computer-readable medium of claim 13, wherein the encryption algorithm comprises a hash algorithm and the encrypted value comprises a hash value of the newly added data.

15. The computer-readable medium of claim 10, wherein, in response to determining that the selected data node comprises data associated with the newly added data, the method further comprises:
separately generating a second character string corresponding to the newly added data and a third character string corresponding to the data associated with the newly added data;
obtaining a sorted character string by sorting the second character string and the third character string using a predetermined method; and
determining a first verification value of the newly added data for the data node by executing a predetermined algorithm on the sorted character string.

16. The computer-readable medium claim 15, wherein the sorted character string comprises a character string group included in the first verification value of the newly added data.

17. The computer-readable medium of claim 10, wherein calculating the updated second verification value of the selected data node comprises:
determining an original second verification value of the selected data node obtained before the newly added data is stored; and
calculating the updated second verification value of the selected data node based on the original second verification value and the first verification value of the newly added data.

18. The computer-readable medium of claim 10, wherein determining the third verification value comprises:
determining a tree structure corresponding to the plurality of data nodes comprised in the block;
determining the original second verification values of the other data nodes comprised in the block;
traversing the tree structure based on the updated second verification value of the selected data node and the original second verification values of the other data nodes comprised in the block, to obtain a third verification value of a root node of the tree structure; and
using the third verification value of the root node as the third verification value of the block.

19. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
  identifying newly added data to be stored in a blockchain;
  selecting, from a block comprising a plurality of data nodes, a data node configured to store the newly added data;
  determining whether the selected data node comprises data associated with the newly added data; and
  in response to determining that the selected data node does not comprise data associated with the newly added data:
    generating a first character string corresponding to the newly added data;
    determining a first verification value of the newly added data for the selected data node by executing a predetermined algorithm on the first character string;
    calculating a second updated verification value of the selected data node based on the first verification value of the newly added data; and
    determining a third verification value of the block based on the second updated verification value of the selected data node and original second verification values of other data nodes of the block, wherein the third verification value of the block is used to verify whether data stored in the block is consistent with data stored in other blocks in a blockchain.

20. The computer-implemented system of claim 19, wherein, in response to determining that the selected data node comprises data associated with the newly added data, the method further comprises:
  separately generating a second character string corresponding to the newly added data and a third character string corresponding to the data associated with the newly added data;
  obtaining a sorted character string by sorting the second character string and the third character string using a predetermined method; and
  determining a first verification value of the newly added data for the data node by executing a predetermined algorithm on the sorted character string.

* * * * *